United States Patent
Higgins et al.

(10) Patent No.: US 9,076,344 B1
(45) Date of Patent: *Jul. 7, 2015

(54) THREE DIMENSIONAL LEARNING AND PROBLEM SOLVING AID FOR TEACHING AND ILLUSTRATING EXEMPLARY THINKING AND PROBLEM SOLVING

(71) Applicants: Linda Shawn Higgins, Mountain View, CA (US); James Ralph Heidenreich, Mountain View, CA (US)

(72) Inventors: Linda Shawn Higgins, Mountain View, CA (US); James Ralph Heidenreich, Mountain View, CA (US)

(73) Assignee: Zxibix, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/694,080

(22) Filed: Oct. 29, 2012

Related U.S. Application Data

(63) Continuation-in-part of application No. 12/804,682, filed on Jul. 26, 2010, now Pat. No. 8,297,981, which is a continuation-in-part of application No. 11/451,870, filed on Jun. 13, 2006, now abandoned.

(60) Provisional application No. 60/690,192, filed on Jun. 13, 2005.

(51) Int. Cl.
*G09B 19/00* (2006.01)
*G09B 7/02* (2006.01)

(52) U.S. Cl.
CPC .................................. *G09B 7/02* (2013.01)

(58) Field of Classification Search
USPC ............... 434/72, 79, 81, 107, 219, 236, 237; 705/10, 11
See application file for complete search history.

(56) References Cited

U.S. PATENT DOCUMENTS

| | | | | |
|---|---|---|---|---|
| 5,662,478 A | * | 9/1997 | Smith, Jr. | 434/237 |
| 5,762,503 A | * | 6/1998 | Hoo et al. | 434/237 |
| 5,830,032 A | * | 11/1998 | Campbell | 446/128 |
| 6,626,677 B2 | * | 9/2003 | Morse et al. | 434/237 |
| 7,083,417 B1 | * | 8/2006 | Liu et al. | 434/236 |
| 8,021,156 B2 | * | 9/2011 | Sweeney | 434/107 |
| 8,075,314 B2 | * | 12/2011 | Cabrera | 434/236 |
| 2002/0103774 A1 | * | 8/2002 | Victor et al. | 706/11 |
| 2007/0122779 A1 | * | 5/2007 | Siler | 434/219 |

* cited by examiner

*Primary Examiner* — Kurt Fernstrom

(57) ABSTRACT

The invention provides a three-dimensional problem solving or learning apparatus for modeling and teaching exemplary problem solving or exemplary thinking. Some embodiments of the present invention provide a puzzle-like form. Another preferred embodiment of the present invention provides for the building of a problem or situation specific or custom learning or problem solving aid. Embodiments of the invention may also incorporate or use electrical, electronic, digital, electro-mechanical, mechanical or other devices, processors or mechanisms, or input or output to or from such or similar elements, and wired or wireless or other networks or interfaces.

20 Claims, 5 Drawing Sheets

THREE DIMENSIONAL LEARNING AND PROBLEM SOLVING AID FOR TEACHING AND ILLUSTRATING EXEMPLARY THINKING AND PROBLEM SOLVING

This application is a continuation-in-part of and claims the benefit of priority under 35 USC §120 to U.S. patent application Ser. No. 12/804,682, filed Jul. 26, 2010, now U.S. Pat. No. 8,297,981, entitled 'Three Dimensional Learning and Problem Solving Aid for Teaching and Illustrating Exemplary Thinking and Problem Solving', incorporated by reference in its entirety herein, which is a continuation-in-part of and claims the benefit of priority under 35 USC §120 to U.S. patent application Ser. No. 11/451,870 entitled 'Three Dimensional Learning and Problem Solving Aid for Teaching and Illustrating Exemplary Thinking and Problem Solving', filed Jun. 13, 2006, incorporated by reference in its entirety herein, which claims priority under 35 USC 119(e) to U.S. Provisional Application No. 60/690,192 filed Jun. 13, 2005 entitled 'Three Dimensional Physical Model for Use in Teaching, Showing, Displaying Understanding and Discussing Integrated Thinking and Knowledge About an Arbitrary Problem,' incorporated by reference.

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyrights whatsoever.

FIELD OF INVENTION

This invention relates to physical and three dimensional learning aids or apparatuses, and particularly to three dimensional aids regarding exemplary thinking and problem solving.

BACKGROUND

The use of physical learning aids, models or puzzle-like apparatuses has been shown to be effective in teaching and illustrating subject matter and concepts in a number of subject areas (for example, biology, chemistry, as well as business specific or technical situations). Physical aids are often effective mechanisms to teach and to illustrate understanding about a subject in ways that flat, paper based or verbal or text explanations cannot. Physical learning aids are often particular useful when the subject matter is complex or difficult to understand or when the subject matter relationships are best illustrated through three dimensional means.

It is well documented that different people learn differently (Howard Gardner, in Frames of Mind, The Theory of Multiple Intelligences, for example). Physical learning aids, puzzles or other like models or physical apparatuses help teach partially because they tap into and use learning styles such as spatial and visual relationships in a tangible and physical way, as opposed to relying solely on verbal or flat diagrammatic learning interaction. Furthermore, learning aids that include physical interaction of the learner with the apparatus—such as in constructing puzzles—tap into additional learning mechanisms.

The teaching and understanding of exemplary or good thinking and problem solving principles and practices is difficult for a number of reasons. First, problem solving is a mental process and as such is invisible; what goes on in an expert problem solver's mind is difficult for a novice learner to grasp partly because it is by nature not physically or visibly evident. Second, teaching problem solving is difficult because every problem or content situation looks different to novice or uninformed problem solvers, even though expert problem solvers think of or approach the different problems based on similar frameworks and ways of thinking about and solving the different problems or content areas. Third, teaching and investigating exemplary problem solving is difficult because it is possible to arrive at an equally good solution or answer or result through taking different paths or orders of steps, even though the approaches—when successful—are likely to share the same "good" problem solving components and principles.

Although good problem solving and thinking is hard to teach, educational experts including the U.S. Department of Education recognize the exemplary thinking and problem solving skills as a significant and important goal for educators and workers in the $21^{st}$ century. In a 2003 report, skills critical to teach children for the future include: "thinking and problem-solving skills that use information and communications technologies to manage complexity, solve problems and think critically, creatively and systematically."

Different people may approach a problem or topic differently. However, expert problem solvers know how to approach the problem, and have common or replicable principles and practices regarding exemplary problem solving or thinking that they rely upon as they address different, specific problems or topics. Expert problem solvers know what problem solving elements and steps they need to accomplish to maximize their probability of a good result, how to organize their thinking and problem solving components, how to manage the information and knowledge activities they need to do, how to evaluate where they are along the way and adjust their emphases to achieve a good result. Teachers and expert adults can try to serve as models in teaching problem solving, for example, by acting out and showing in verbal dialogue some of their thinking and problem solving development. However, teaching good or exemplary problem solving or thinking is difficult to teach and to show that there are replicable or common characteristics to good or exemplary problem solving and thinking across different subject or topic situations, or to teach or show what principles and practices should guide problem solving or thinking in a way that is useful across multiple project situations, and ideally also useful in a specific topic or problem situation. A new learning aid to assist in teaching these practices and principles—and to show exemplary thinking in its rich relationships—is much needed.

There have been attempts at using flat diagrams—such as concept "bubble" diagrams or tree structures—to show relationships between content ideas and concepts, and these are sometimes called "visual thinking." They are essentially diagrams with shapes labeled with various content, as a means to show content relationships (as in a diagram to show "mammals" and then types of "mammals", "water based" and "land based" for example, and so on). However, such content diagrams do little to help teach a comprehensive thinking and problem solving process and do not assist in effectively showing or teaching the underlying and replicable principles and practices or rich relationships that make up exemplary problem solving and thinking approaches.

Other attempts at teaching good or in some ways exemplary thinking and problem solving have included the use of step by step flat diagrams that illustrate problem solving activities as a set of linear steps (such as identifying the problem, researching the problem, developing an answer to the problem). However, such step by step diagrams imply or dictate there is only one way to get to a right or good solution or answer, which is not the case. They also do not illustrate the real thinking and problem solving components or complex relationships that expert thinkers and problem solvers consider and use to develop their views and solutions to problems or topics of inquiry, or to evaluate their progress and adjust their course along the way.

There is a need for an effective means to teach and illustrate the common, replicable components and multidimensional relationships that make up good or in some ways exemplary thinking and problem solving, both as a general, replicable, overall approach and for use or application in specific situations.

SUMMARY OF THE INVENTION

In a preferred embodiment, the present invention is a physical, three dimensional learning and problem solving aid or model or apparatus that helps teach and illustrate the components and relationships between components inherent in good or in some ways exemplary problem solving and thinking approaches. In its preferred embodiment, the invention provides an overall, replicable, recognizable archetype model that embodies and can be used to help teach good problem solving and thinking approaches across different project or problem situations. In its preferred embodiment, the invention is also applicable to and customizable for any specific problem, topic or project situation, and provides for the ability of a person or persons to build their own customized three dimensional model or artifact of their thinking and problem solving in the context of the overall model or approaches.

DETAILED DESCRIPTION

Figure 1:
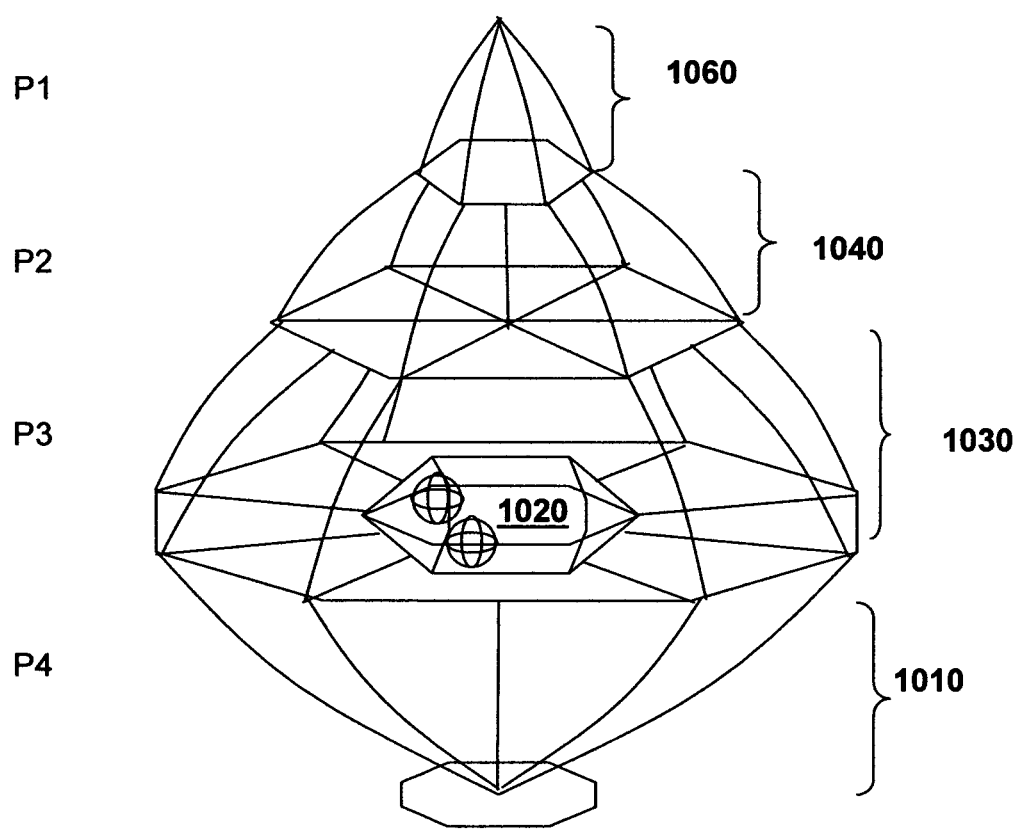
FIG. 1 is one example embodiment of a three dimensional learning and problem solving aid, illustrating distinction and relationship of categories of thinking and problem solving components.

The present invention is a physical, three dimensional learning and problem solving aid or apparatus that helps teach and illustrate the components and relationships between components inherent in good or in some ways exemplary thinking and problem solving. The invention is applicable to any subject matter or domain area, and particularly applicable to situations in which the learner or user is dealing with problems or topics with information or perspectives that involve some level of interpretation (although it may also be used in very straightforward subject matter, for example particularly with younger learners). The invention may be utilized to discuss and teach components of good or exemplary thinking or problem solving in a general way or may be implemented with regard to a specific problem or topic situation.

The description that follows describes the invention utilizing specific examples and embodiments. It should be appreciated that the invention is not limited to these specific described examples, and may be implemented in other embodiments consistent with the scope, intent and characteristics of the invention.

Embodiments of the present invention generally distinguish different categories of thinking or problem solving components associated with sound or robust or in some sense exemplary problem solving and thinking within the overall physical three dimensional learning apparatus (for example, the existence of a problem, a solution, supporting information and others, described more fully below). Embodiments of the present invention also generally include the depiction of relationships between categories of components of thinking or problem solving (for example, relationships between information or data that is known, the question or problem or topic addressed or being addressed, and the solution or answer or viewpoint provided or being developed). Some preferred embodiments of the invention further include the physical representation of elements within the category of thinking or problem solving component (as for example, in the depiction of sub questions or subtopics that further delineate the general problem or topic). Some embodiments of the present invention are constructed to allow a puzzle-like use of the learning apparatus, as the apparatus' components or regions may be constructed, taken apart and put back together, in some embodiments similar to a set of blocks. Another preferred embodiment of the present invention provides for the building of a problem specific learning and problem solving aid, as in one constructed from the available elements and components of the 3D learning and problem solving aid in a manner that conforms to the general common principles for exemplary thinking and relationships, but does so in a manner that reflects the particulars of the specific problem at hand, or the preferences of the particular author or constructor. The manner in which the present invention accomplishes these distinctions and relationships and functionality will become more apparent through the description below.

The three dimensional geometric learning and problem solving aid is, in preferred embodiments, comprised first of a number of regions or structures which indicate and preferably differentiate the existence of different categories of thinking and knowledge components that are a part of good or in some sense exemplary problem solving. In preferred embodiments, it is a significant advantage of the structure or aid that exemplary problem solving is visibly shown through the visual, physical structures or regions that represent exemplary problem solving component categories and their relationships— and that in some embodiments these are shown in a manner that is useful or replicable across multiple and different problem solving or topical situations. Referring to FIG. 1, for example, one embodiment includes a problem or questioning or topic description or similarly designated region or structure (block 1010), an information or data or information organization or similarly designated region or structure (block 1020), an analysis or knowledge, or analysis and knowledge, or similarly designated region or structure (block 1030), a meaning making or conclusionary or similarly designated region or structure (block 1040) and may also in some embodiments include an argument or story or similarly designated region or structure, an answer or solution or summary view or similarly designated region or structure (block 1060), and potentially others (see also further description herein). FIG. 1 also shows one embodiment of placement of the exemplary problem solving or thinking structures or regions in relationship to one another, arranged spatially to convey exemplary relationships, also further described herein and evident in the figures. FIG. 1 is also one embodiment that shows exemplary problem solving structures arranged in spaces defined as P1 through P4, indicating spaces or levels of one embodiment of the structure. Additional labels or other naming or designation that is similar to or synonymous with these categories could be used for the exemplary problem solving structures being shown in relationship to one another, without departing from the invention. It is a further advantage of preferred embodiments that the exemplary problem solving structures and relationships can be used in different degrees of project complexity or different stages of understanding development. Two additional embodiments are shown, for example, in FIG. 14 (comprising exemplary problem solving structures comprising block 1010, a problem, question, or topic or similarly designated structure; block 1020, an information or data or information organization or similarly designated region or structure; block 1030, a knowledge or analysis or knowledge and analysis or similarly designated structures and block 1060, an answer or solution or summary view or similarly designated structure, and their relationships) and FIG. 15 (comprising problem solving structures in blocks 1010, 1030, and 1060, and their relationships), showing simpler embodiments that might be used, for example, in teaching and illustrating exemplary problem solving or thinking components and their relationships with younger audiences or in earlier stages of problem solving or understanding development.

Figure 2:
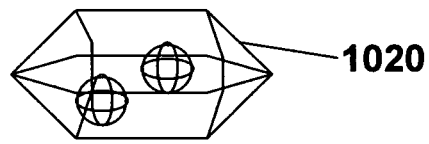
FIG. 2 is one example of portions of a puzzle-like embodiment of a three dimensional learning and problem solving aid.
Figure 2:
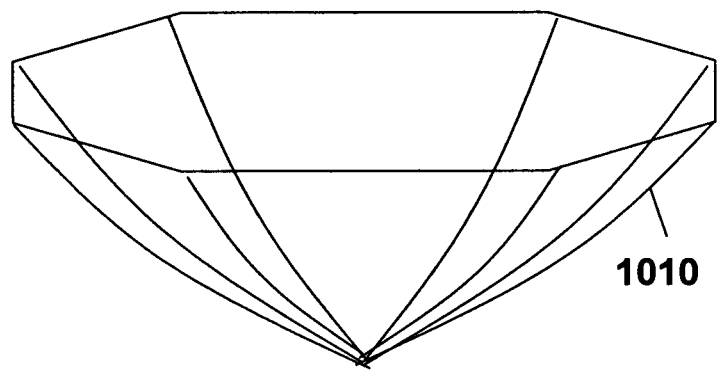
Figure 3:
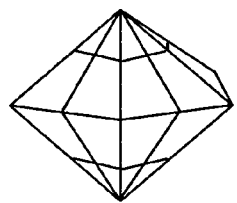
FIGS. 3-13 show illustrative alternative overall geometric shapes or constructions that may be utilized to accomplish the invention.
Figure 4:
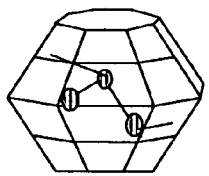
Figure 5:
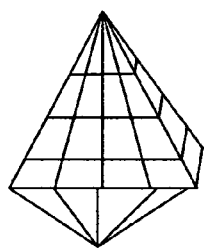
Figure 6:
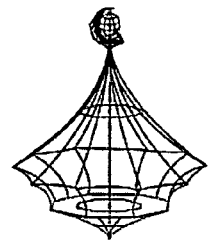
Figure 7:
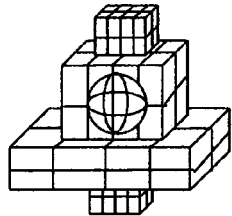
Figure 8:
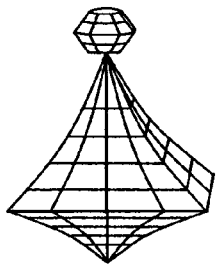
Figure 9:
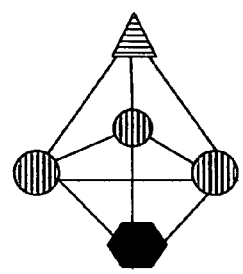
Figure 10:
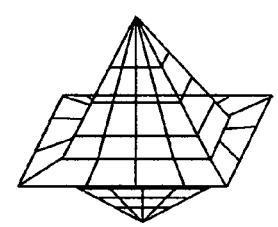
Figure 11:
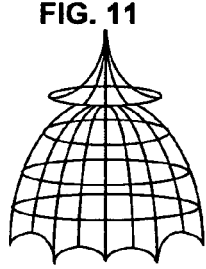
Figure 12:
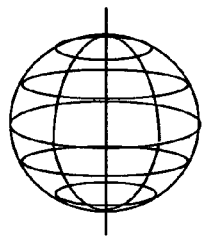
Figure 13:
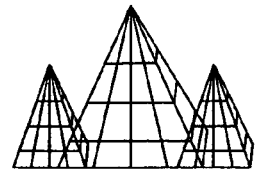

FIG. 2 shows portions of a similarly shaped embodiment of the physical learning and problem solving aid, in this embodiment as a puzzle-like apparatus that may be constructed, taken apart and put back together or reconfigured. By having pieces of the learning aid that can be constructed, disassembled or reconfigured, this embodiment of the 3D learning aid facilitates the enhanced investigation of the multiplicity of relationships inherent in good or exemplary thinking and problem solving between and among the distinct categories, and enables the development or representation of customized models. Additionally, the puzzle-like implementation of the invention taps into additional physical and spatial learning skills.

Embodiments of the present invention include the implementation of the learning aid or apparatus in a plurality of sizes, including but not limited to: 1.) a desktop or hand-held size learning and problem solving aid (for example and illustrative purposes, perhaps 6-12 inches tall); 2.) an exhibit size learning and problem solving aid (for example and illustrative purposes, perhaps 6 feet tall); 3.) a walk in or otherwise physically interactive sized learning and problem solving aid, such as might be utilized in museum, school or other settings, and others. It should be appreciated that the value of the learning and problem solving aid can be realized in a plurality of sizes and particular implementations, without departing from the intent or scope of the invention.

One embodiment of the three dimensional learning and problem solving aid is in a generalizable use, showing relationships and components that are indicative generally of sound and robust thinking. Another embodiment of the present invention provides for the ability of a person or persons or constructor to build their own customized three dimensional model or artifact of their thinking and problem solving for a specific problem or topic being addressed. In this manner, one embodiment of the present invention when implemented to provide a problem-specific 3D learning aid, can for example be used to present a particular topic or problem or viewpoint, and can assist, for example, in discussing and evaluating the relative completeness or robustness of the model (whether information has been accumulated at all yet, or for all of the sub questions, for example), or which analysis sectors have or have not been used, whether specific conclusions are supported by information and the like. It should be appreciated that in both generalizable and problem specific embodiments of the present invention, a plurality of relationships, and learning messages (and in the case of problem specific embodiments, evaluations) can be enabled by the geometry and construction of the 3D learning and problem solving aid.

The present invention, for example in one preferred embodiment as illustrated in FIGS. 1 and 2, thus depicts a set of different types of thinking and problem solving components preferably utilized by expert problem solvers when addressing a question or topic, or providing an answer, solution or viewpoint, for example. In preferred embodiments, the present invention further, through the use of geometric regions or otherwise distinguished structures, conveys and depicts not only the preferred existence of these categories of thinking or problem solving, but relationships between those categories of thinking and problem solving. In this example and other embodiments, the relationships between said thinking or problem solving categories are evident through the use of different structures (shown in FIG. 1, for example, such as 1030, 1040, 1060, 1020, and 1010) and their relative positioning and adjacency or other physical relationship to one another. Embodiments of the present invention may also utilize planes or other physical placement mechanisms within the total geometric shape (as indicated in FIG. 1 by notations P1, P2, P3, and P4) to similarly help distinguish between categories of thinking and problem solving components and their relationships to one another.

Figure 15:
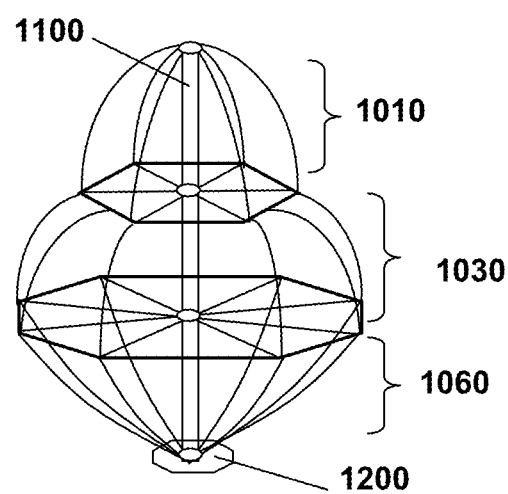
FIG. 15. shows another example embodiment.

Preferred embodiments of the present invention may also incorporate a central axis or one or more connectors, shown for example as element 1100 in FIG. 15, that connects the problem or topic region to the answer or solution region.

It should be appreciated that many shapes can accomplish the advantage and functionality of the physical learning and problem solving aid, some of which are shown in FIGS. 6-13. Some characteristics of the combinations of geometric shapes that may be utilized for the learning and problem solving aid are discussed further herein. Some embodiments of the present invention further utilize color to distinguish between categories of thinking or problem solving components. Such color may be utilized in some embodiments in conjunction with different shapes of the structures that make up the regions of the overall 3D learning and problem solving aid (for example, through the addition of different colors to the regions and structures shown in FIGS. 1 and 2). Color may also be used in some embodiments as a primary distinguisher, as in the application of different colors to a 3D geometric overall shape such as FIG. 7 or FIG. 12 in which the regions are distinguished structurally through planes and color and physical location in relation to one another, as opposed to distinguished with different shapes for different regions.

Embodiments of the present invention may include specific elements within or related to regions (for example to depict specific sub questions within or related to the question/problem definition region, or specific analyses within or related to the analysis category region or structure), as well as linkages, which may be related to one another or to components or elements in such a way as to depict and therefore provide both learning and understanding about: 1.) generalizable "good" thinking and problem solving approaches, as well as 2.) the status, health, and robustness of the thinking and problem solving related to a specific problem or topic, including for example the connections between or among components or elements or both.

For example, referring to FIG. 1, in this embodiment, region 1030 the analysis region is subdivided into 6 sub regions, representing 6 analyses. Similarly, in FIG. 1, region 1010, the questioning region, is this example embodiment is subdivided into 8 different sub questions or subtopics. In some embodiments, such subdividing of categories of thinking or problem solving components may be accomplished through the sectoring or other physical subdivision of the overall region (as shown in regions 1030 and 1010 for example) or may be accomplished through the inclusion of other physical or otherwise represented elements within or related to the region or problem solving category space (as for example, shown in the information organization region 1020, elements 1020*a* and 1020*b*, in FIG. 2). It should be appreciated that although this embodiment shows sectoring utilized in regions 1030 and 1010, in FIG. 1, for example, and the inclusion of physical elements within or related to a category space, as in region 1020, elements 1020*a* and 1020*b* in FIG. 2, that these two approaches to accomplishing the definition of sub elements within an overall category of problem solving and thinking may be utilized in the different regions in other combinations or frequency without departing from the scope and invent of the invention.

Embodiments of such subject specific models may include additional depiction of the general relationships and types of thinking and knowledge activities that comprise the archetype thinking and knowledge building process. For example, in one subject specific embodiment, it is possible to build a subject specific model that might show, for example, that not all questions have information related to them, or that the conclusions and meaning seems to all come out of or be based on one set of information, and the like.

The advantages of different embodiments of the present invention include but are not limited to the following: 1.) the 3D aid more accurately reflects the kinds of thinking and knowledge activities, and their relationships, than can otherwise be displayed, taught, or understood; 2.) the 3D aid provides for a manipulative model which in some preferred embodiments can be taken apart, rotated, reconstructed, monitored and used to discuss and investigate the importance and role and relationships of different types of thinking and knowledge activities in good problem solving, or for a specific or customized model; 3.) the 3D aid can be utilized in some embodiment to develop specific or customized models or viewpoints of particular problems and their associated information and solutions, and can in some embodiments be used as comparative models to one another; 4.) the 3D aid's characteristics, definitions of categories and relationships between categories and in some embodiments elements of good thinking and problem solving help teach and model complex thinking behaviors in ways that help demystify and teach the thinking process; 5.) the combination of structure and form with flexibility to build customized models (or regions with specific components) provides a unique and valuable means of having replicable thinking and knowledge components or processes that work across specific problems or topics or customized viewpoints; and others.

Embodiments of the 3 dimensional models can be embodied as small or very large models. For example, one embodiment is built as a small desktop, personalized model, to be used for example as reminders of the elements and architecture of good thinking. Another embodiment is built as a model perhaps 2 feet tall, with removable parts and to be used in discussions and teaching situations about thinking and knowledge building about arbitrary problems, or building topic or subject specific or customized models. A third embodiment of the 3 dimensional model could be a model large enough to walk into and experience for example from inside the model, still showing the various relationships and components, either about the generalizable thinking problem solving process and structure, or as a content and subject specific large embodiment, as might be built for a museum. It should be appreciated that the different size embodiments similarly can implement the categories of thinking or problem solving, elements associated with categories of thinking or problem solving, and linkages in a broad range of sizes, with potentially different interactive characteristics as a result (for example, the inclusion of other physical interactive elements related to or within an overall aid). Level of detail and intricacy may also vary significantly in different embodiments.

Figure 15A:
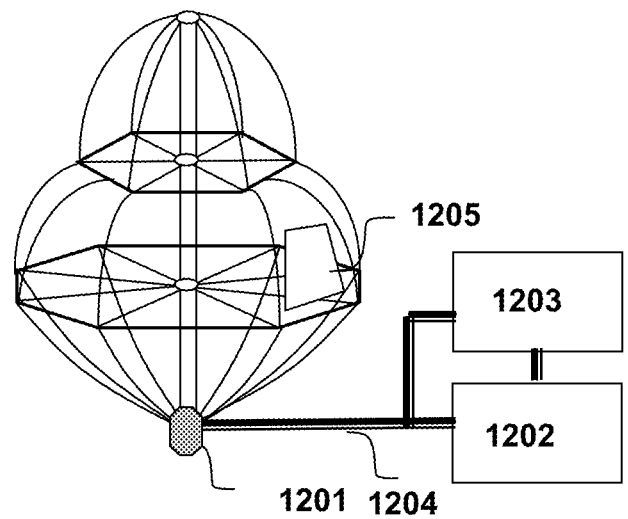
FIGS. 15A and 15B show additional example embodiments with additional details for the example embodiment in FIG. 15.

FIG. 1 is a side schematic view of one embodiment of a three dimensional integrated learning and problem solving aid, in which relationships between categories of thinking and problem solving components are conveyed as related regions and areas or structure within an overall geometric context. FIG. 2 shows an example embodiment of the 3D learning and problem solving aid in which the different portions of thinking can be taken apart and put back together or reconfigured, similar to a 3D puzzle or set of related blocks. It should be appreciated that embodiments of the invention for the construction, disassembly, movement, reconfiguration, presentation or investigation of components or elements or of the overall learning and problem solving aid may also incorporate or use (as indicated in FIG. 15 block 1200 and detailed in FIGS. 15A and 15B) electrical, electronic, digital, electromechanical, mechanical or other devices (as shown for example in FIG. 15B block 1206, and may incorporate or use networks as shown for example in block 1204), mechanisms, processors (shown for example in FIGS. 15A and 15B block 1202), sensors (shown for example in FIG. 15B block 1209), analog/digital converters (shown for example in FIG. 15B block 1208), projectors, displays (shown for example in FIGS. 15A and 15B block 1203 output, and FIG. 15A block 1205), or controllers (shown for example in FIG. 15B block 1207), and the like, or input or output to or from such or similar elements (shown in FIGS. 15A and 15B block 1201 interface and block 1203 output). FIG. 2 further shows some embodiments of mechanisms to show problem solving and thinking elements within categories of problem solving and thinking components, as might be constructed or utilized to model a specific problem or topic being addressed, also as further described elsewhere herein.

In some embodiments, the distinctions between different categories of thinking and problem solving components is accomplished primarily through the use of different shapes that are spatially situated in relation to one another, as for example shown in FIGS. 1 and 2. In other embodiments, the differentiation between categories of thinking and problem solving components is accomplished primarily through the use of color (as for example might be shown utilizing the overall geometry of FIG. 7 or FIG. 12 and applying different colors to the different regions). In most embodiments, physical location and proximity are utilized both to distinguish and relate categories. In other embodiments, a combination of these different factors may be used, as also described herein. It should be appreciated that some embodiments may use color, shape, or placement to differentiate elements or linkages also.

Further description of one embodiment of a 3D learning and problem solving aid follows. In the example embodiment in FIG. 14, the information component is represented by a spherical object shown in the middle of the model, noted as block 1020. In some embodiments, this spherical object may be a single sphere, as used in providing a generalizable 3D learning and problem solving aid. In other embodiments— like subject specific embodiments, for example—the sphere or other three dimensional, centrally or otherwise located object may be hollow and open to reveal other specific information and data portions, contained within the larger spherical or centrally located object, an example of which is shown in FIG. 2, block 1020a. In other embodiments, specific spheres or other shapes may be utilized to represent specific portions of information, located centrally or otherwise within or related to the overall geometry of the learning and problem solving aid, and connected with rods or other connectors to the respective questions, analyses, and/or meaning or conclusion statements to which they relate, as would be useful in the accomplishment of a problem specific 3D learning and problem solving aid.

Continuing with FIG. 1, in this illustrative embodiment, the analysis activities of good thinking and problem solving may be represented by a collection of geometric shapes as in block 1030, which may be formed around the information components or otherwise represented in proximity to the information components. In some embodiments, the collection of geometric or other shapes representing the activities can be taken apart, as shown in FIG. 2, or included as appropriate in subject specific models, and may be further differentiated by color or other variances from one another.

Continuing with FIGS. 1 and 2, in these example embodiments of the 3D learning and problem solving aid, the set of questions, topics, or other means of expressing the problem or area of interest may be represented by a three-dimensional structure and portion of the total 3D learning and problem solving aid, as indicated in block 1010. In one embodiment, for example, the topic set is represented by a web of related, like physical components, arranged either in a single plane (as within an octagonal like shape) or in three dimensions as shown in block 1010 in FIGS. 1 and 2.

In one embodiment, the relationships between the topic set components may be represented by connecting poles, rods, or other similar structures. In another embodiment, the region associated with questioning or defining the problem may be represented by a set of related planes or facets of a three dimensional, open structure; in one preferred embodiment, the number of facets used in a specific model may correspond to the number of major subtopics or subquestions for the problem being addressed. It should be appreciated that these and other alternatives may also be used to depict other components or elements of the aid.

Continuing with FIG. 1, one embodiment of the three dimensional learning and problem solving aid may include a set of components and/or a region representing the making of meaning from information and analysis, about the problem or topic being addressed, shown in block 1040. Such meaning components will in a preferred embodiment be physically proximal to information and/or analysis components, and may be further represented with rods, poles, or similar structures representing for example logical links between information and/or analysis and the appropriate meaning components, again as might be provided in a situation-specific use of the 3D learning and problem solving aid. It should be appreciated that some embodiments may use, employ or represent linkages through electronic, electrical, digital, electro-mechanical or mechanical means, or combinations of same or similar mechanisms. Meaning components in a preferred embodiment may include conclusions, observations, ideas, hypotheses and other similar statements or conceptions of meaning.

Figure 14:
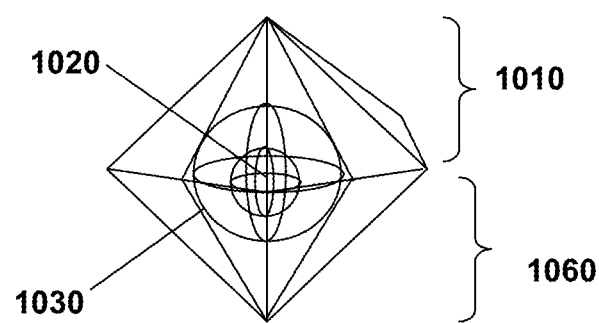
FIG. 14 shows another example embodiment.

Continuing with FIGS. 1, 14 and 15, one embodiment of the three dimensional learning and problem solving aid may include a set of components and/or region representing the overall answer or summary view for the project or arbitrary problem. One embodiment is shown in block 1060. In a preferred embodiment, the answer or summary view forms or is located at one consolidating point (for example, as the top or the bottom) of the overall three dimensional learning and problem solving aid. In one embodiment, the overall geometry of the total three-dimensional model may be structured to show symmetry and relationship between the main problem or subject and the overall answer or summary view, as for example in the inclusion of a central axis or other connector between the problem and the solution or answer, as also discussed elsewhere herein.

In one embodiment, the 3 dimensional model may also include an area and/or linkages representing the argument or persuasive storyline preferred by the author, for example, to represent or otherwise order the elements of the meaning components in particular, as indicated by block 1060.

Figure 15B:
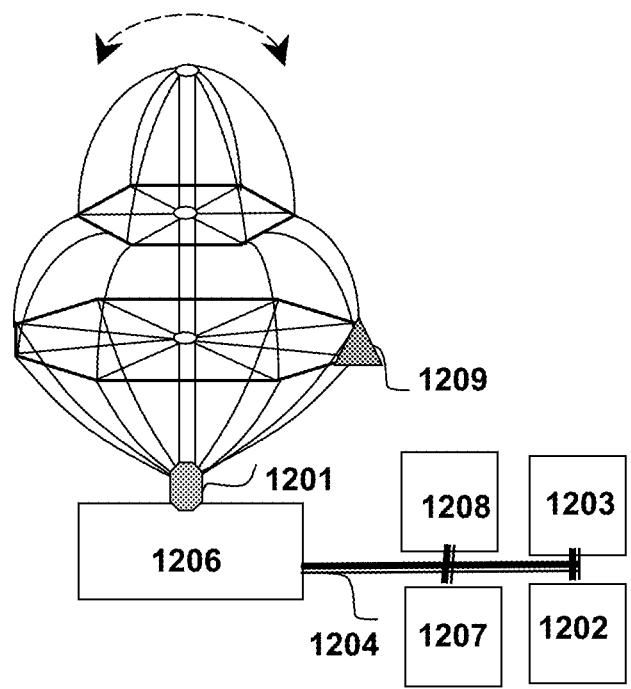

Some embodiments of the three dimensional learning and problem solving aid may include components or elements with flat or otherwise notatable or displayable surfaces, on which to depict the collection of statements or information (or graphics or drawings, or images, including for example still, animated or video) (shown for example in FIG. 15A block 1205) which make up the content of any of the particular thinking or knowledge components or elements, such as for example, the meaning set for the model's target subject. In some embodiments, the physical objects used for the components may alternatively include a slot or other compartment or mechanism for attaching paper or other medium with problem or project specific content. For example, the physical components used for the individual subquestions defining a specific project or problem may include fasteners, slots, windows, compartments, or other means for a user to attach or otherwise include or display content to represent their specific questions. Such content may be depicted on paper, cloth, cardboard, dry erase board, many other media, glass, plexiglass, electronic or digital display or production mechanisms, or even other physical artifacts. Some embodiments incorporate or use or access electronic or digital input receivers (shown for example in FIGS. 15A and 15B block 1201, interface), or output mechanisms (shown for example in FIGS. 15 and 15B block 1201, interface and block 1203 additional output), for receiving input from or providing output to (for example via a network as shown in FIG. 15 and FIG. 15B block 1204) a computer (shown for example in FIGS. 15A and 15B block 1202), processor (shown for example in FIGS. 15A and 15B block 1202), or electronic, electro-mechanical, or mechanical device (shown for example in FIG. 15B block 1206), output producer (shown for example in FIGS. 15A and 15B block 1203), or object. In this manner, a person, teacher, team or museum may build subject specific models out of common physical components representing the types of thinking and knowledge activities, but do so in a manner that achieves a subject or project specific result.

The implementation of the 3 dimensional learning and problem solving aid may be accomplished through the use of a plurality of materials. In one embodiment, the various spines that make up a region oriented model (as shown in FIG. 1) may be constructed of metal, wood, plastic, wire, or a plurality of similar or other suitable materials. In some embodiments, the facets and shapes associated with the various regions or areas (for example, the question or problem definition area or question facets, the informational sphere or other geometric object, etc.) may be constructed of plexiglass, plastic, glass, wood, metal, paper, cardboard, or many other materials. In one preferred embodiment, some of the facets are constructed with transparent materials such as glass or colored plexiglass, to allow easy viewing of internal structures and/or specific components and linkages. In some embodiments, electronic, electrical, or digitally represented, constructed or projected elements or components may be used. In another embodiment, solid plexiglass is used. In another embodiment, the three dimensional model may be constructed with transparent facets such that the facets form lenses through which the subsets of related components can be seen.

In some embodiments, the construction of the three dimensional model is done so that the model is flexible, as might be attained if the model were built out of wire or other flexible materials. The flexible embodiment, for example, would further allow the general shape and positioning of the components or regions to be manipulated or moved in space and/or in relation to one another while still maintaining the overall linkages.

What is claimed is:

1. A three dimensional learning or problem solving constructed apparatus that depicts exemplary problem solving or exemplary thinking components and their relationships, said apparatus comprising:
   a three-dimensional, multifaceted overall constructed structure comprising at least three distinguished structures or regions designated or identified as representing exemplary problem solving or exemplary thinking component categories, comprising at least one structure or region designated or identified as representing at least one problem or question or topic, at least one structure or region designated or identified as representing at least one answer or solution or summary view, and at least one structure or region designated or identified as representing at least one analysis or knowledge component or as at least one analysis and knowledge component;
   further comprising that the structures or regions designated or identified as representing exemplary problem solving or exemplary thinking component categories are arranged spatially as though around a central axis;
   further comprising that the structures or regions representing the at least three exemplary problem solving or exemplary thinking categories have different characteristics that visually distinguish the structures or regions representing the three problem solving component categories from one another;
   further comprising incorporation of at least one item comprising at least one electronic, electric, digital, electro-mechanical, mechanical, or networked element, portion, component, linkage, mechanism, device, processor, controller, sensor, converter, monitor, display, medium, interface, projector, input receiver, or output producer, or input to or output from said items, or a combination thereof.

2. The apparatus of claim 1 comprising at least one structure portion comprising at least one digitally, mechanically, electro-mechanically, or electronically constructed, embodied, presented, distinguished, displayed, projected, or outputted item, or a combination thereof.

3. The apparatus of claim 1 comprising at least one additional item comprising at least one additional exemplary problem solving or thinking component category, at least one problem solving or thinking component, at least one element related to at least one exemplary problem solving or thinking category, at least one subdivided or sectored structure or region, at least one linkage or connector or rod, at least one transparent item, at least one curved item, at least one structure or region or linkage contained at least partially within the spatial boundaries of at least one other structure or region, at least one portion of text or graphics or video or animation or audio, or a combination thereof.

4. The apparatus of claim 1 further comprising at least one mechanism, fastener, surface, window, attachment, compartment, transparent item, production mechanism, device, interface, display, projection, medium, component, or element to include, attach, notate, display, present, receive, output, or project related content, or enable the viewing or investigation or distinguishing of at least a subset of the structure, or a combination thereof.

5. The apparatus of claim 1 further comprising at least one portion of the structure having at least one characteristic of being capable of being varied, said characteristic comprising at least one of being capable of being puzzle-like, taken-apart, disassembled, put back together, reconfigured, constructed, reconstructed, distinguished, rotated, moved, manipulated, subdivided, varied with regard to number, varied with regard to shape, varied with regard to spatial positioning, varied with regard to color, varied with regard to the notation or attachment or inclusion or display or projection or output of related content, varied with regard to electronic or digital or mechanical characteristics, or a combination thereof.

6. The apparatus of claim 1 further comprising at least one additional item comprising at least one mechanism or device or both for monitoring, controlling, manipulating, receiving input to or providing output from at least a portion of the apparatus.

7. The apparatus of claim 5 further comprising that at least one portion of the apparatus can be varied manually or varied using at least one interface, receiver, sensor, monitor, mechanism, controller, converter, device, processor, computer, networked processor, networked device, electronic device, electrical device, mechanical device, or a combination thereof.

8. A three dimensional learning or problem solving constructed apparatus that depicts exemplary problem solving or exemplary thinking components and their relationships, said apparatus comprising:
   a three-dimensional overall structure comprising at least three distinguished structures or regions designated or identified as representing exemplary problem solving or exemplary thinking component categories, comprising at least one structure or region designated or identified as at least one problem or question or topic, at least one structure or region designated or identified as at least one answer or solution or summary view, and at least one structure or region designated or identified as at least one additional exemplary problem solving or exemplary thinking component category;
   further comprising that the structures or regions representing the at least three exemplary problem solving or exemplary thinking categories have different characteristics that visually distinguish the structures or regions representing the three problem solving categories from one another;
   further comprising that structures or regions representing exemplary problem solving or thinking component categories are arranged spatially as though around a central axis;
   further comprising at least one item comprising at least one electronic, electric, digital, electro-mechanical, mechanical, or networked item, or digitally, mechanically, electro-mechanically, or electronically constructed, embodied, presented, distinguished, projected, displayed, manipulated, received, or outputted item, or a combination thereof.

9. The apparatus of claim 8 further comprising at least one item comprising at least one electronic, electric, digital, electro-mechanical, mechanical, or networked element, component, linkage, mechanism, device, processor, computer, controller, sensor, monitor, converter, display, projector, interface, medium, input receiver, or output producer, or input to or output from at least a portion of the apparatus, or a combination thereof.

10. The apparatus of claim 8 comprising at least one additional item comprising at least one additional exemplary problem solving or thinking component category, at least one problem solving or thinking component, at least one element related to at least one exemplary problem solving or thinking category, at least one subdivided or sectored structure or region, at least one linkage or connector or rod, at least one transparent item, at least one curved item, at least one structure or region or linkage contained at least partially within the spatial boundaries of at least one other structure or region, at least one portion of text or graphics or video or animation or audio, or a combination thereof.

11. The apparatus of claim 8 further comprising at least one mechanism, fastener, surface, window, attachment, compartment, transparent item, production mechanism, device, display, interface, projection, medium, component, or element to include, attach, notate, display, present, receive, output, or project related content, or enable the viewing or investigation or distinguishing of at least a subset of the structure, or a combination thereof.

12. The apparatus of claim 8 further comprising at least one portion of the structure having at least one characteristic of being capable of being varied, said characteristic comprising at least one of being capable of being puzzle-like, taken-apart, disassembled, put back together, reconfigured, constructed, reconstructed, distinguished, rotated, moved, manipulated, subdivided, varied with regard to number, varied with regard to shape, varied with regard to spatial positioning, varied with regard to color, varied with regard to the notation or attachment or inclusion or display or projection or output of related content, varied with regard to electronic or digital or mechanical characteristics, or a combination thereof.

13. The apparatus of claim 8 further comprising at least one additional item comprising at least one mechanism or device or both for monitoring, controlling, manipulating, receiving input to or providing output from at least a portion of the apparatus.

14. The apparatus of claim 12 further comprising that at least one portion of the apparatus can be varied manually or varied using at least one interface, receiver, sensor, monitor, controller, converter, device, processor, computer, networked processor, networked device, electronic device, electrical device, mechanical device, or a combination thereof.

15. A three dimensional learning or problem solving constructed apparatus that depicts exemplary problem solving or exemplary thinking components and their relationships, said apparatus comprising:
a three-dimensional overall structure comprising at least three distinguished structures or regions designated or identified as representing exemplary problem solving or exemplary thinking categories, comprising at least one structure or region designated or identified as at least one problem or question or topic, at least one structure or region designated or identified as at least one answer or solution or summary view, and at least one structure or region designated or identified as at least one additional exemplary problem solving or exemplary thinking category;
further comprising that the structures or regions representing the at least three exemplary problem solving or exemplary thinking categories have different characteristics that distinguish the structures or regions representing the three problem solving categories from one another;
further comprising that the structures or regions representing exemplary problem solving or thinking component categories are arranged spatially as though around a central axis;
further comprising at least one mechanism, fastener, surface, window, attachment, compartment, transparent item, production mechanism, device, interface, display, component, medium, input receiver, output provider, or element to include, attach, notate, display, present, distinguish, receive, output or project content related to the structure.

16. The apparatus of claim 15 further comprising at least one item comprising at least one electronic, electric, digital, electro-mechanical, mechanical, or networked item, or digitally, mechanically or electronically constructed, embodied, presented, distinguished, projected, displayed, manipulated, received, or outputted item, or a combination thereof.

17. The apparatus of claim 15 comprising at least one additional item comprising at least one additional exemplary problem solving or thinking component category, at least one problem solving or thinking component, at least one element related to at least one exemplary problem solving or thinking category, at least one subdivided or sectored structure or region, at least one linkage or connector or rod, at least one transparent item, at least one curved item, at least one structure or region or linkage contained at least partially within the spatial boundaries of at least one other structure or region, at least one portion of text or graphics or video or animation or audio, or a combination thereof.

18. The apparatus of claim 15 further comprising at least one portion of the structure having at least one characteristic of being capable of being varied, said characteristic comprising at least one of being capable of being puzzle-like, taken-apart, disassembled, put back together, reconfigured, constructed, reconstructed, distinguished, rotated, moved, manipulated, subdivided, varied with regard to number, varied with regard to shape, varied with regard to spatial positioning, varied with regard to color, varied with regard to the notation or attachment or inclusion or display or projection or output of related content, varied with regard to electronic or digital or mechanical characteristics, or a combination thereof.

19. The apparatus of claim 15 further comprising at least one additional item comprising at least one mechanism or device or both for monitoring, controlling, manipulating, receiving input to or providing output from at least a portion of the apparatus.

20. The apparatus of claim 15 further comprising at least one item comprising at least one electronic, electric, digital, electro-mechanical, mechanical, or networked element, component, linkage, mechanism, device, processor, computer, controller, monitor, sensor, converter, display, interface, medium, projector, input receiver, or output producer, or input to or output from the apparatus, or a combination thereof.

* * * * *